US007010462B2

(12) United States Patent
Sumner et al.

(10) Patent No.: US 7,010,462 B2
(45) Date of Patent: Mar. 7, 2006

(54) SYSTEM AND METHOD FOR EVALUATING EFFICIENCY LOSSES FOR TURBINE COMPONENTS

(75) Inventors: William James Sumner, Ballston Spa, NY (US); John David Alaksiewicz, Clifton Park, NY (US); Chris Robin Bron, Springfield, IL (US); Mary Clarkeson Phillips, Delmar, NY (US); Peter Schofield, Schenectady, NY (US); David Edwin Kautzmann, Scotia, NY (US); Brian William Marriner, Scotia, NY (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 10/663,991

(22) Filed: Sep. 17, 2003

(65) Prior Publication Data

US 2005/0075799 A1 Apr. 7, 2005

(51) Int. Cl.
*G01B 5/28* (2006.01)

(52) U.S. Cl. .......................... 702/185; 73/104; 374/43; 250/330; 356/239.7; 702/35; 702/36

(58) Field of Classification Search ................ 702/185, 702/35–36; 374/43, 25; 250/330; 356/237.1, 356/239.7, 239.8, 237.2; 60/685, 686, 39.82, 60/775

See application file for complete search history.

(56) References Cited

U.S. PATENT DOCUMENTS

| | | | | |
|---|---|---|---|---|
| 4,384,452 | A * | 5/1983 | Rice | 60/39.182 |
| 4,776,765 | A | 10/1988 | Sumner et al. | |
| 5,992,152 | A * | 11/1999 | Weres et al. | 60/685 |
| 6,325,596 | B1 | 12/2001 | Tomko | |
| 6,375,417 | B1 | 4/2002 | Hofer et al. | |
| 6,422,743 | B1 * | 7/2002 | Nirmalan et al. | 374/43 |
| 6,589,012 | B1 | 7/2003 | Burnett et al. | |
| 2005/0036135 | A1 * | 2/2005 | Earthman et al. | 356/237.1 |

* cited by examiner

*Primary Examiner*—John Barlow
*Assistant Examiner*—Hien Vo
(74) *Attorney, Agent, or Firm*—Nixon & Vanderhye P.C.

(57) ABSTRACT

A method and system of evaluating a turbine component comprises obtaining data relating to respective surface conditions at a plurality of different surface locations of the turbine component and calculating the total profile efficiency loss for the turbine component based on the data. Calculating the total profile efficiency of the turbine component may include calculating the local profile efficiency loss percentage for each of the surface conditions at the different surface locations (and/or sub-areas of the different surface locations) and calculating an average of the local profile efficiency loss percentages, each of the local efficiency loss percentages being weighted by respective predetermined weight factors. The turbine component may be a nozzle or a bucket and each of the turbine component's surface locations may be an admission suction surface, an admission pressure surface, a discharge suction surface or a discharge pressure surface.

26 Claims, 7 Drawing Sheets

| Nozzle Data | |
|---|---|
| REN | 3,246,938 |
| Throat at Pitch | 0.552 |
| Reynold's Number | 13,233,929 |
| Axial Width | 2.250 |
| Base RMS | 32 |

| Influence Factor |
|---|
| 0.100 |

| STAGE # | |
|---|---|
| 7 | |
| TOTAL PROFILE LOSS OF NOZZLE | 0.52% |

| | | | % of S. F. Loss | Surface Location | % of local area | $R_{a\text{-}rms}$ μ-in | Severity Rank of Surface Condition | Surface Condition Type | $k_S$ Factor from CRB Matrix | $k_S/L$ (x $10^{-3}$) | PE Loss % |
|---|---|---|---|---|---|---|---|---|---|---|---|
| | | Admission Side Losses Must Equal 10% | 5% | $ASS_1$ | 50% | 68 | 2 | 3 | 0.119 | 0.014 | 0.177% |
| | | | | $ASS_2$ | 50% | 65 | 2 | 3 | 0.119 | 0.014 | 0.155% |
| | | | | $ASS_3$ | 0% | | | | | | |
| | | | 5% | $APS_1$ | 100% | 75 | 2 | 3 | 0.119 | 0.016 | 0.228% |
| | | | | $APS_2$ | 0% | | | | | | |
| | | | | $APS_3$ | 0% | | | | | | |
| | | | 0% | $OSW_{AS}$ | 0% | | | | | | |
| | | | 0% | $ISW_{AS}$ | 0% | | | | | | |
| Discharge Side Losses Must equal 90% | Discharge Side Suction Surface Must equal 70% | Throat Losses 7-20% DSS | 7% | $THT_1$ | 50% | 100 | 3 | 3 | 0.332 | 0.059 | 1.276% |
| | | | | $THT_2$ | 50% | 70 | 2 | 3 | 0.119 | 0.015 | 0.192% |
| | | | | $THT_3$ | 0% | | | | | | |
| | | | 0% | $OSW_{THT}$ | 0% | | | | | | |
| | | | 0% | $ISW_{THT}$ | 0% | | | | | | |
| | | Discharge Side Losses Should Equal 76-90% | 63% | $DSS_1$ | 50% | 91 | 3 | 3 | 0.332 | 0.054 | 1.191% |
| | | | | $DSS_2$ | 50% | 58 | 2 | 3 | 0.119 | 0.012 | 0.104% |
| | | | | $DSS_3$ | 0% | | | | | | |
| | DPS Must Equal 20% | | 20% | $DPS_1$ | 100% | 75 | 2 | 3 | 0.119 | 0.016 | 0.228% |
| | | | | $DPS_2$ | 0% | | | | | | |
| | | | | $DPS_3$ | 0% | | | | | | |
| | | | 0% | $OSW_{DS}$ | 0% | | | | | | |
| | | | 0% | $ISW_{DS}$ | 0% | | | | | | |
| | | TOTAL | 100% | | | | | | | TOTAL | 0.524% |
| | | | 60 | 54 | 55 | 51 | 53 | 52 | 56 | 57 | 58 |

Fig. 7

| Surface Condition Type of Deterioration | | Severity Rank of Surface Condition | | | | | | | | |
|---|---|---|---|---|---|---|---|---|---|---|
| | | New surface or None of the I.F. defects | Very Light | Light | Moderately Light | Moderate | Moderately Heavy | Heavy | Very Heavy | Severe |
| | | New/None | VL | L | ML | M | MH | H | VH | SVE |
| | | 1 | 2 | 3 | 4 | 5 | 6 | 7 | 8 | 9 |
| New machining marks with flow (Power-File or Belt Sander) | 0 | 0 | 0.2 | 0.2 | 0.2 | 0.2 | 0.2 | 0.2 | 0.2 | 0.2 |
| New machining marks X-flow (Swirls or Roloc Sanding Disc) | 1 | 0.1 | 0.4 | 0.4 | 0.4 | 0.4 | 0.4 | 0.4 | 0.4 | 0.4 |
| Coatings (Plasma/HVOF) | 2 | 0.76 | 0.76 | 0.76 | 0.76 | 0.76 | 0.76 | 0.76 | 0.76 | 0.76 |
| Deposits (smooth) | 3 | 0.1 | 0.119 | 0.332 | 0.546 | 0.76 | 0.973 | 1.186 | 1.4 | 2 |
| Deposits-Striated linear build-ups. Typ. in latter LP and some IP stages | 4 | 0.1 | 0.119 | 0.332 | 0.546 | 0.76 | 0.973 | 1.186 | 1.4 | 2 |
| Deposits-Fences. Typ. in the Latter LP stages. | 5 | 0.1 | 0.8 | 1 | 1.2 | 1.4 | 1.65 | 1.8 | 2 | 2.5 |
| Solid Particle Erosion (SPE) | 6 | 0.1 | 0.119 | 0.332 | 0.546 | 0.76 | 0.973 | 1.186 | 1.4 | 2 |
| Grit Blast Cleaning (BC) | 7 | 0.1 | 0.119 | 0.332 | 0.546 | 0.76 | 0.973 | 1.186 | 1.4 | 2 |
| SPI-Small Particle Impingement | 8 | 0.1 | 0.8 | 1 | 1.2 | 1.4 | 1.65 | 1.8 | 2 | 2.5 |
| FOD-Foreign Object Damage | 9 | 0.1 | 0.8 | 1 | 1.2 | 1.4 | 1.65 | 1.8 | 2 | 2.5 |
| Water Erosion | 10 | 0.1 | 0.119 | 0.332 | 0.546 | 0.76 | 0.973 | 1.186 | 1.4 | 2 |
| Corrosion Pitting | 11 | 0.1 | 0.119 | 0.332 | 0.546 | 0.76 | 0.973 | 1.186 | 1.4 | 2 |

FORMULAS

Nozzles: $SF_{TOTAL\ LOSS\ Nozz}$ = 10%(ASS+APS)+20%(DPS)+70%(THT +DSS)

Buckets: $SF_{TOTAL\ LOSS\ Bkt}$ = 100%(.30*ASS+.20*APS+.30*DPS+.1*THT+.20*DSS)

*Fig. 8*

SYSTEM AND METHOD FOR EVALUATING EFFICIENCY LOSSES FOR TURBINE COMPONENTS

BACKGROUND OF THE INVENTION

This invention relates to a system and method of evaluating a turbine component and, more specifically, to a system and method of determining a total profile efficiency loss for a steam turbine component due to its surface conditions.

A steam turbine is often used to rotate a rotor in an electrical power generator. In particular, steam obtained by operation of a boiler may be directed along a steam flow path by a nozzle against a plurality of turbine blades, or buckets, connected to the rotor. The rotor is rotated within a stator by the steam flowing against the buckets to generate electrical power.

Abrasive materials are often carried by the steam as it flows through the turbine. These abrasive materials cause erosion of turbine components such as sealing strips, buckets and nozzles which are located along the steam flow path. Erosion of some of these turbine components result in excessive clearances being formed, often leading to increased steam leakage in the turbine. In addition to abrasive materials causing erosion of turbine components, the steam often carries contaminates which may deposit and collect on turbine components located along the steam flow path. These deposits of contaminates increase the surface roughness of the turbine components and may actually disturb the desired flow pattern of the steam.

The erosion of some turbine components and the collection of deposits on other turbine components are merely two examples of the many types of deterioration that may develop on the surfaces of turbine components after extended (e.g., ten years) operation. The operational efficiency losses of the steam turbine increase as the surface conditions of the turbine components deteriorate. In particular, the heat needed to enable the electrical generator to produce a given amount of electricity increases as the operational efficiency losses of the steam turbine increase.

In order to combat operational efficiency losses of the turbine, a service technician conducts a steam path audit. During the steam path audit, the service technician observes the surface conditions of turbine components located along the steam flow path for erosion, contaminate deposits and/or other signs of deterioration. This audit may be periodically scheduled for, for example, every five years of operation of the steam turbine.

A service technician typically determines a total profile efficiency loss for a turbine component in the steam flow path as a result of the judgments he/she reaches during the steam path audit. A determination on whether to repair or replace one or more of the turbine components can be made based on the judgments. However, the judgments reached are highly subjective and depend on the skill and experience level of the technician. The judgments may thus vary widely from technician to technician. Moreover, the judgment is "broad-brushed" in that a total profile efficiency loss for the entire turbine component is determined based on an evaluation of a single (local) surface location of that turbine component and a loss efficiency curve for that single surface location.

There thus remains a need to calculate the total profile efficiency loss of turbine components located along a steam path in a more accurate and repeatable fashion. That is, it would be beneficial to minimize the widely variable conclusions from different technicians evaluating the same turbine component and to increase accuracy of the total profile efficiency loss calculation by considering multiple surface conditions at different respective surface locations of the same turbine component. Exemplary embodiments of the present invention resolve these and other needs.

BRIEF DESCRIPTION OF THE INVENTION

In one exemplary aspect of the invention, a method of evaluating a turbine component comprises obtaining data relating to respective surface conditions at a plurality of different surface locations of the turbine component and calculating the total profile efficiency loss for the turbine component based on the data relating to the respective surface conditions at the different surface locations. Calculating the total profile efficiency of the turbine component may include calculating the local profile efficiency loss percentage for each of the surface conditions at the different surface locations and calculating an average of the local profile efficiency loss percentages, each of the local efficiency loss percentages being weighted by respective predetermined weight factors. Calculating the total profile efficiency of the turbine component may include calculating respective local profile efficiency loss percentages for each of the surface conditions at a plurality of sub-areas of at least one of the different surface locations and calculating an average of the local profile efficiency loss percentages, each of the local efficiency loss percentages being weighted by respective predetermined weight factors. Calculating the total profile efficiency loss for the turbine component may include calculating a sand grain roughness number (Ks) for each surface condition at the different surface locations. Calculating the total profile efficiency loss for the turbine component may include calculating a sand grain roughness number (Ks) for each surface condition at a plurality of sub-areas of at least one of the different surface locations. Each of the local profile efficiency loss percentages for each of the surface conditions at the respective surface locations may be calculated based on a sand grain roughness number (Ks) determined for that surface condition. Each of the local profile efficiency loss percentages for each of the surface conditions at the respective sub-areas may be calculated based on a sand grain roughness number (Ks) determined for that surface condition. The obtained data relating to surface conditions at each of the different surface locations may include data relating to a condition type and a severity of condition of each of the surface conditions, and calculating the total profile efficiency loss for the turbine component may include determining a surface roughness factor for each surface condition based on the condition type and the severity of the condition obtained for that surface condition. The obtained data may include data relating to a condition type and a severity of condition for each of the surface conditions at the sub-areas, and calculating the total profile efficiency loss for the turbine component may include determining a surface roughness factor for each of the surface conditions at each of the sub-areas based on the condition type and the severity of the condition obtained for that surface condition. The obtained data relating to surface conditions of each of the different surface locations may be one or more of the following types of data: surface roughness, surface condition type and severity of surface condition. The turbine component may be a nozzle or a bucket and each of the surface locations of the turbine component may be one of following: admission suction surface, admission pressure surface, discharge suction surface and discharge pressure surface.

In another exemplary aspect of the present invention, a computerized system for evaluating a turbine component comprises (i) a data input that receives data relating to respective surface conditions at a plurality of different surface locations of the turbine component and (ii) a processor that calculates the total profile efficiency loss for the turbine component based on the data relating to the respective surface conditions at the different surface locations. The processor may calculate the total profile efficiency of the turbine component by at least calculating the local profile efficiency loss percentage for each of the surface conditions at the different surface locations and calculating an average of the local profile efficiency loss percentages, each of the local efficiency loss percentages being weighted by respective predetermined weight factors. The processor may calculate the total profile efficiency of the turbine component by at least calculating respective local profile efficiency loss percentages for each of the surface conditions at a plurality of sub-areas of at least one of the different surface locations and calculating an average of the local profile efficiency loss percentages, each of the local efficiency loss percentages being weighted by respective predetermined weight factors. The processor may calculate the total profile efficiency loss for the turbine component by at least calculating a sand grain roughness number (Ks) for each surface condition at the different surface locations. The processor may calculate the total profile efficiency loss for the turbine component by at least calculating a sand grain roughness number (Ks) for each surface condition at a plurality of sub-areas of at least one of the different surface locations. Each of the local profile efficiency loss percentages for each of the respective surface conditions at the surface locations may be calculated by the processor based on a sand grain roughness number (Ks) determined for that surface condition. Each of the local profile efficiency loss percentages for each of the surface conditions at the respective sub-areas may calculated by the processor based on a sand grain roughness number (Ks) determined for that surface condition. The received data relating to surface conditions at each of the different surface locations may include data relating to a condition type and a severity of condition of each of the surface conditions and the processor may calculate the total profile efficiency loss for the turbine component by at least determining a surface roughness factor for each surface condition based on the condition type and the severity of the condition obtained for that surface condition. The received data may include obtaining data relating to a condition type and a severity of condition for each of the surface conditions at the sub-areas and the processor may calculate the total profile efficiency loss for the turbine component by determining a surface roughness factor for each of the surface conditions at each of the sub-areas based on the condition type and the severity of the condition obtained for that surface condition. The received data relating to surface conditions at each of the different surface locations may be one or more of the following types of data: surface roughness, surface condition type and severity of surface condition. The turbine component may be a nozzle or a bucket and each of the surface locations of the turbine component may be one of following: admission suction surface, admission pressure surface, discharge suction surface and discharge pressure surface.

BRIEF DESCRIPTION OF THE DRAWINGS

FIG. 7 is a representation of data showing local profile efficiency loss percentages for a plurality of surface conditions at respective surface locations of a turbine component and the total profile efficiency loss percentage of the turbine component calculated in accordance with an exemplary embodiment of the present invention;

FIG. 8 is a data matrix used to determine a surface roughness factor in accordance with an exemplary embodiment of the present invention.

DETAILED DESCRIPTION OF THE INVENTION

Figure 1:
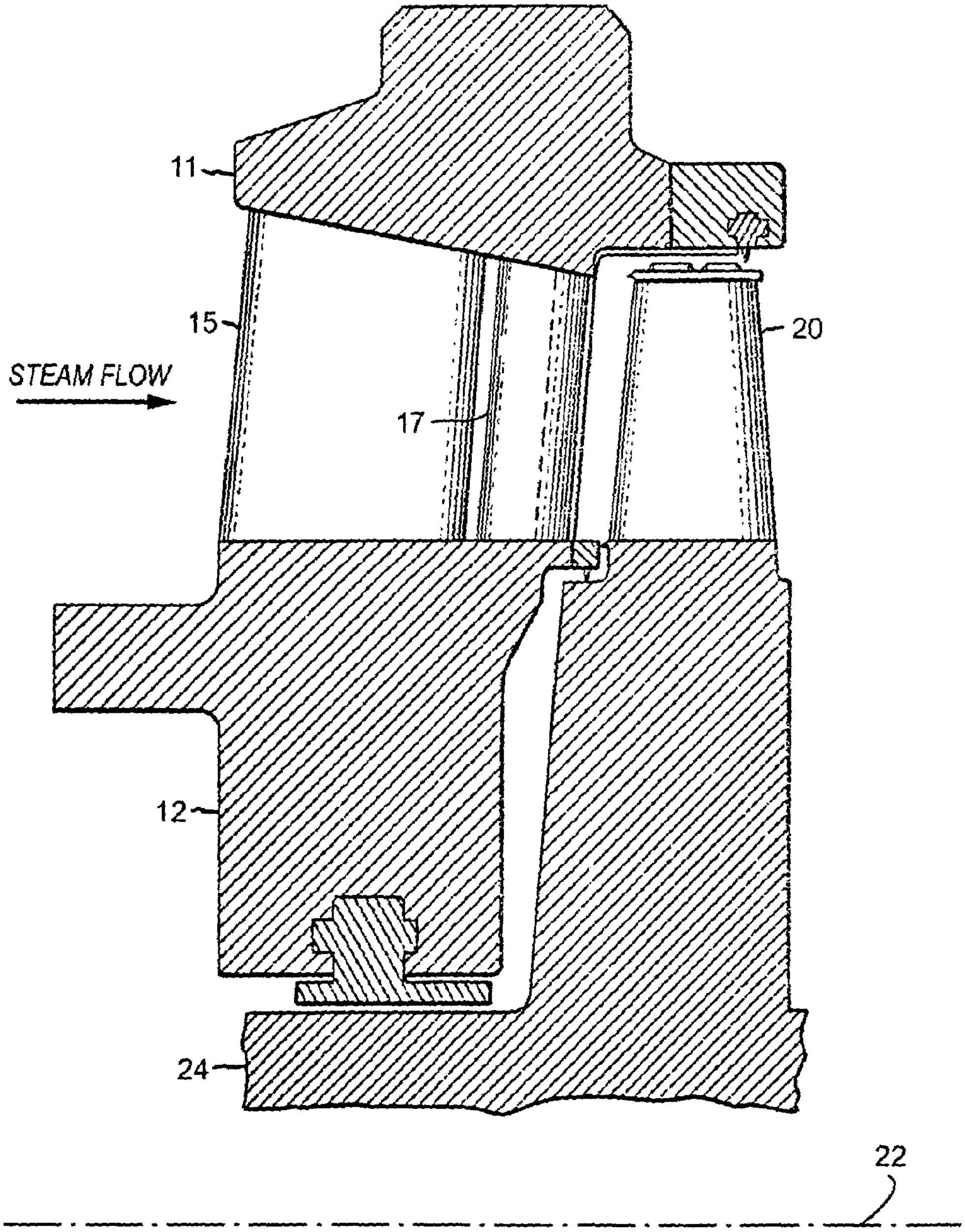
FIG. 1 is a partial cross-sectional view of a steam turbine including a nozzle and a bucket.

FIG. 1 illustrates a stage of an axial flow steam turbine. The steam turbine includes a plurality of partitions (one shown) of a nozzle 17, a diaphragm having a inner diaphragm ring 12 and an outer diaphragm ring 11, bridging partition 15 and a plurality of buckets 20 (one shown). The partitions of nozzle 17 are radially disposed between inner diaphragm ring 12 and outer diaphragm ring 11. Bridging partition 15 is disposed between an upstream partition of nozzle 17 and radially extends between inner diaphragm ring 12 and outer diaphragm ring 11 for supporting and maintaining inner diaphragm ring 12 concentrically within outer diaphragm ring 11. Outer diaphragm ring is secured to a casing or housing (not shown). Buckets 20 are connected to and rotatable with rotor 24 about axis of rotation 22.

Figure 2:
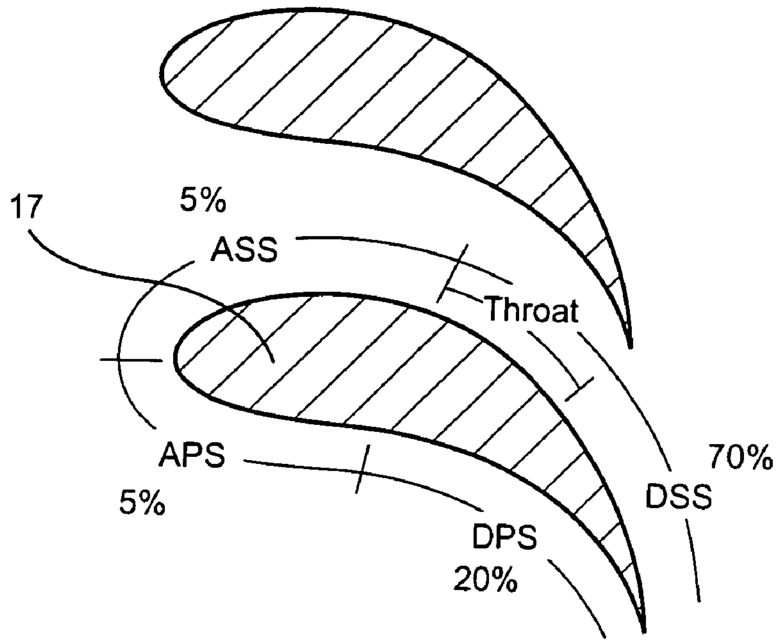
FIG. 2 is a view of a steam turbine nozzle having different surface locations.
Figure 3:
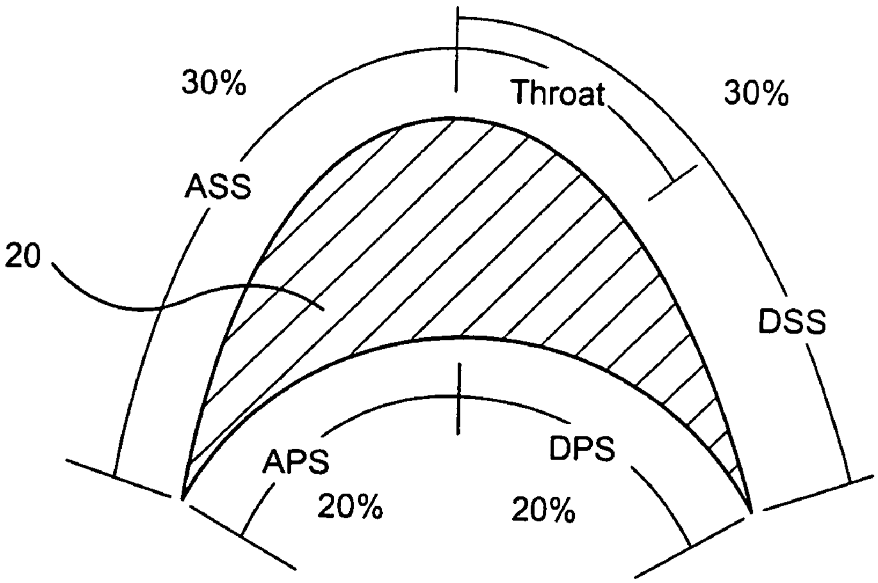
FIG. 3 is a view of a steam turbine bucket having different surface locations.

Referring to FIGS. 2 and 3, each of the nozzle 17 and bucket 20 includes a number of different surface locations. In particular, nozzle 17 (see FIG. 2) and bucket 20 (see FIG. 3) each includes the following surface locations: admission suction surface (ASS), admission pressure surface (APS), discharge suction surface (DSS) and discharge pressure surface (DPS). A portion of the DSS is the throat (THT) surface location.

Each of the respective surface locations has an associated predetermined weighting factor which relates that surface location's relative contribution to the total profile efficiency loss of the entire turbine component. As illustrated in FIG. 2 for example, the surface conditions of the ASS and APS of nozzle 17 each has a weighting factor of 5%, whereas surface conditions of the DSS (including the THT) has a weighting factor or 70% and the surface condition of the DPS has a weighting factor of 20%. The cumulative local profile efficiency losses resulting from the surface conditions at the discharge side (DSS and DPS) of the nozzle 17 are thus the dominate, but not exclusive, contributors in determining the total profile efficiency loss of nozzle 17. Specifically, the discharge side losses for nozzle 17 have a cumulative weighting factor of 90% (70% for DSS losses plus 20% for DPS losses) toward the calculation of the total profile efficiency loss of nozzle 17, whereas the admission side losses for nozzle 17 have a cumulative weighting factor of only 10% (5% for ASS losses plus 5% for APS losses) toward the calculation of the total profile efficiency loss of nozzle 17. As illustrated in FIG. 3, the surface condition(s) of the ASS of bucket 20 has a weighting factor 30%, the surface condition(s) of the APS of bucket 20 has a weighting factor of 20%, the surface condition(s) of the DSS has a weighting factor of 30%, and the surface condition(s) of the DPS has a weighting factor of 20% toward the calculation of the total profile efficiency loss of bucket 20. The cumulative local profile efficiency losses from the surface conditions at the admission side (ASS plus APS) of bucket 20 and the cumulative local profile efficiency losses from the surface conditions at the discharge side (DSS plus DPS) of bucket 20 are equally weighted in calculating the total profile efficiency loss of the entire bucket 20.

Figure 4:
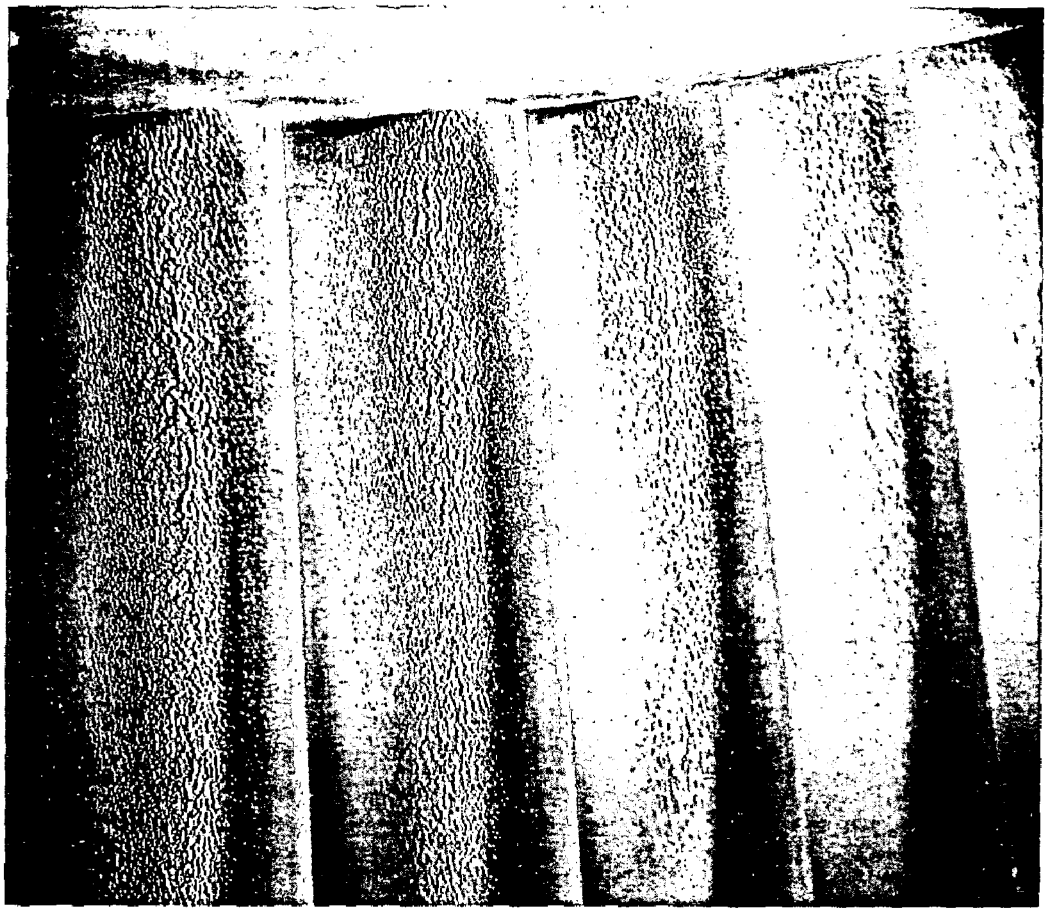
FIG. 4 is a photograph of steam turbine nozzles having a collection of deposits.

Steam generated by a boiler (not shown) of the steam turbine is directed by nozzle 17 against buckets 20 to rotate rotor 24 about axis 22. However, the surface conditions of turbine components, such as nozzle 17 and buckets 20, in the steam flow path deteriorate as a result of, for example, abrasive materials and contaminates carried by the steam. A total profile efficiency loss of the turbine component is produced as a result of its deteriorated surface conditions. The type(s) of the deteriorated surface condition(s) of a particular surface location (ASS, APS, DSS or DPS) of the turbine component or sub-areas of a particular surface location may be, for example, one of the following: new machining marks, coatings, deposits, solid particle erosions, grit blast cleaning, small particle impingement, foreign object damage, water erosion and corrosion pitting. FIG. 4 illustrates, for example, deposits that have collected on the APS of nozzle 17.

Figure 5:
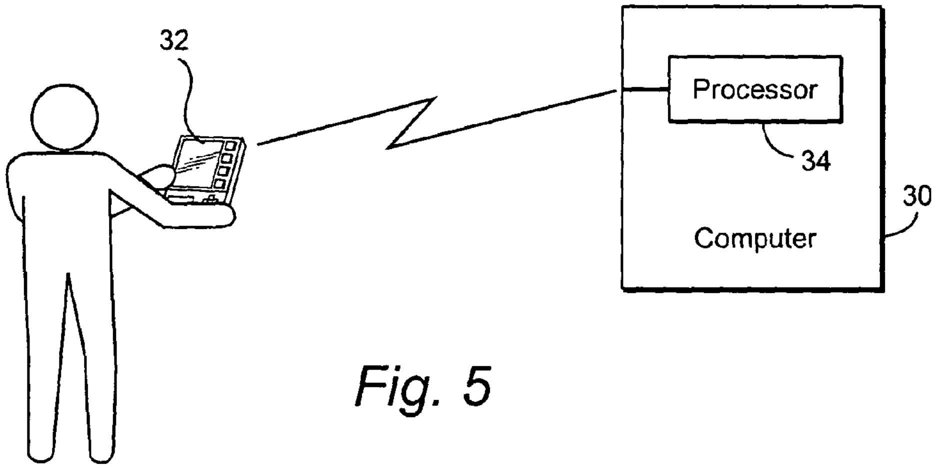
FIG. 5 illustrates a technician transmitting data obtained during a steam path audit of a steam turbine to a computer.

FIG. 5 illustrates a technician conducting a steam path audit of turbine components. During an audit of a particular turbine component, the technician identifies one or more surface conditions for each surface location ASS, APS, DSS and DPS of the turbine component. The surface location DSS includes a throat (THT) surface location for which the technician may identify a surface condition. The technician inputs observations of turbine component surface conditions in a hand held computer device 32. In particular, the technician inputs for each different surface condition of the turbine component data relating to the following: surface roughness (measured in $\mu$-inches), condition type of surface deterioration (e.g., machining marks, coatings, deposits, solid particle erosion, grit blast cleaning, small particle impingement, foreign object damage, water erosion or corrosion pitting), severity of the surface condition (e.g., new or no damage, light, very light, moderately light, moderate, moderately heavy, heavy, very heavy or severe), surface location (e.g., ASS, ASP, DSS or DSP) and sub-areas (e.g., ASS1 and ASS2 sub-areas of surface location ASS and DSS1 and DSS2 sub-areas of surface location DSS) of the surface location including the measured fraction of area covered by each sub-area within its surface location. The surface roughness may be quantifiably measured by a profilometer operated by the technician and/or be defined by a quantifiable number assigned by the technician through comparisons to standards of a comparator board.

Device 32 wirelessly transmits the data to computer 30. Computer 30 includes a processor 34 for processing the input data such as calculating the local profile efficiency loss percentage for each of the surface conditions detected on the turbine component and the total profile efficiency loss of the turbine component based on the local profile efficiency loss percentages as will be discussed in detail below. Alternatively, device 32 can transmit data to computer 30 via a hard wire connection between device 32 and computer 30, or the technician may record the surface condition and later manually enter data into computer 30 for processing by processor 34 or transfer data via a computer storage medium.

Figure 6:
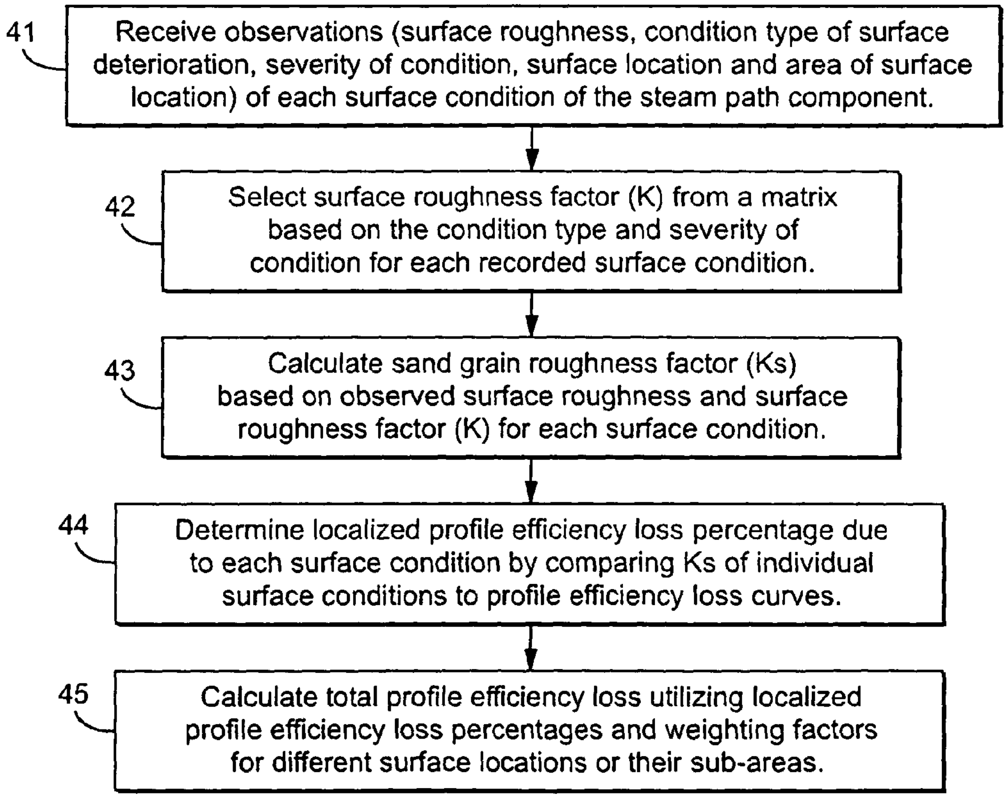
FIG. 6 is a flow diagram illustrating a method of evaluating a steam turbine component in accordance with an exemplary embodiment of the present invention.

FIG. 6 illustrates a process of calculating a total profile efficiency of a turbine component which may be implemented by computer 30. Data is received by computer 30 reflecting each surface condition of the turbine component identified by the technician (step 41). For example, as illustrated in the graphical representation shown in FIG. 7, computer 30 receives data reflecting surface roughness (column 51), surface condition type of deterioration (column 52), severity of the surface condition (column 53), surface location (column 54) and a percentage of area covered by a sub-area(s) within a surface location (column 55).

FIG. 8 illustrates a data matrix relating surface condition type on one axis and a severity rank of a surface condition on another axis. The data matrix may be stored by computer 30. As can be seen on the vertical axis of the data matrix, data reflecting the surface condition type of deterioration received by processor 34 may be one of the following: 0=new machining marks with flow (power file or belt sander), 1=new machining marks X-flow (swirls or roloc sandin disc), 2=coatings (plasma/HVOF), 3=deposits (smooth), 4=deposits. (striated linear build-ups), 5=deposits (fences), 6=solid particle erosion 7=grit blast cleaning, 8=small particle impingement, 9=foreign object damage, 10=water erosion, or 11=corrosion pitting. As can be seen by the horizontal axis of the data matrix, data reflecting a severity rank of the surface condition received by the processor 34 may be one of the following: 1=new or no defects in surface condition, 2=very light, 3=light, 4=moderately light, 5=moderate, 6=moderately heavy, 7=heavy, 8=very heavy or 9=severe.

Processor 34 selects a surface roughness factor (K) based on the received surface condition type and the severity of that condition type and the data matrix (step 42 of FIG. 6). The data matrix is universally used to select the surface roughness factor (K) of each surface condition of the steam turbine components. For example, as illustrated in FIG. 7, the received surface condition type of the APS of nozzle 17 is “3” (see col. 52) indicating that the deterioration of the admission side pressure surface (APS) of nozzle 17 comprises smooth deposits. The severity of the smooth deposits of the APS of nozzle 17 is “2” (see col. 53) indicating that the severity of the smooth deposits is very light. By looking at the intersection of “3” on vertical axis and “2” on the horizontal axis of the data matrix, a surface roughness factor of 0.119 is selected by processor 34 for the surface condition at the APS of nozzle 17. Similarly, a surface roughness factor is selected for each of the other surface locations ASS, DSS (including a selection of a surface roughness factor for the throat portion THT of DSS) and DPS.

One or more of the surface locations ASS, APS, DSS (including THT) and DPS may have a plurality of different surface conditions. For example, a first sub-area ASS1 of the ASS of a turbine component may have a surface roughness of 68 $\mu$-in whereas a second sub-area ASS2 of the ASS surface location may have a surface roughness of 65 $\mu$-in. Alternatively, a first sub-area ASS1 of the ASS surface location may have a “light” amount of deposit build-up whereas a second sub-area ASS2 of the same ASS of the turbine component may have a “very light” amount of deposit build-up. Data originating from technician input may therefore include identification of a number of sub-areas (e.g., ASS1 and ASS2) and measured or estimated % area of that surface location covered by the sub-area (see col. 55 of FIG. 7). As an example, the data screen illustrated in FIG. 7 shows that two different sub-areas ASS1 and ASS2 having different surface roughnesses but equal % areas of the ASS of nozzle 17 have been identified by the technician. That is, each of the sub-areas ASS1 and ASS2 constitute 50% of the total area of the ASS of nozzle 17. A separate surface roughness factor is selected via the data matrix for each of the sub-areas. The surface roughness factor for two different sub-areas (e.g., DSS1 and DSS2) of the same surface location (DSS) may be different if the condition type of surface deterioration and/or the severity of the condition measured by the technician are different. While the above examples of sub-areas ASS1 and ASS2 of surface location ASS and sub-areas DSS1 and DSS2 of surface location DSS each define two different sub-areas of a surface location, it will be appreciated that any number of sub-areas can be defined to match the number of different surface conditions within that same surface location.

After a surface roughness factor (K) is determined, processor 34 calculates an equivalent sand grain roughness factor (Ks) for each identified surface condition based on the surface roughness factor (K) and the measured surface roughness at that location (step 43 of FIG. 6). An equivalent sand grain roughness factor (Ks) is determined for each surface roughness factor (K) based on the surface roughness factor (K) and the surface roughness measured for that surface location (or sub-area of the surface location) using conventional theories (e.g., boundary layer theory by Schlichting). Each sand grain roughness factor (Ks) for each surface location or sub-area of the surface location is stored by computer 30 (see col. 56 in FIG. 7). A ratio (Ks/L) of the sand grain roughness factor Ks and the axial width L of the turbine component is also calculated and stored by computer 30 (see col. 57 in FIG. 7).

Figure 9:
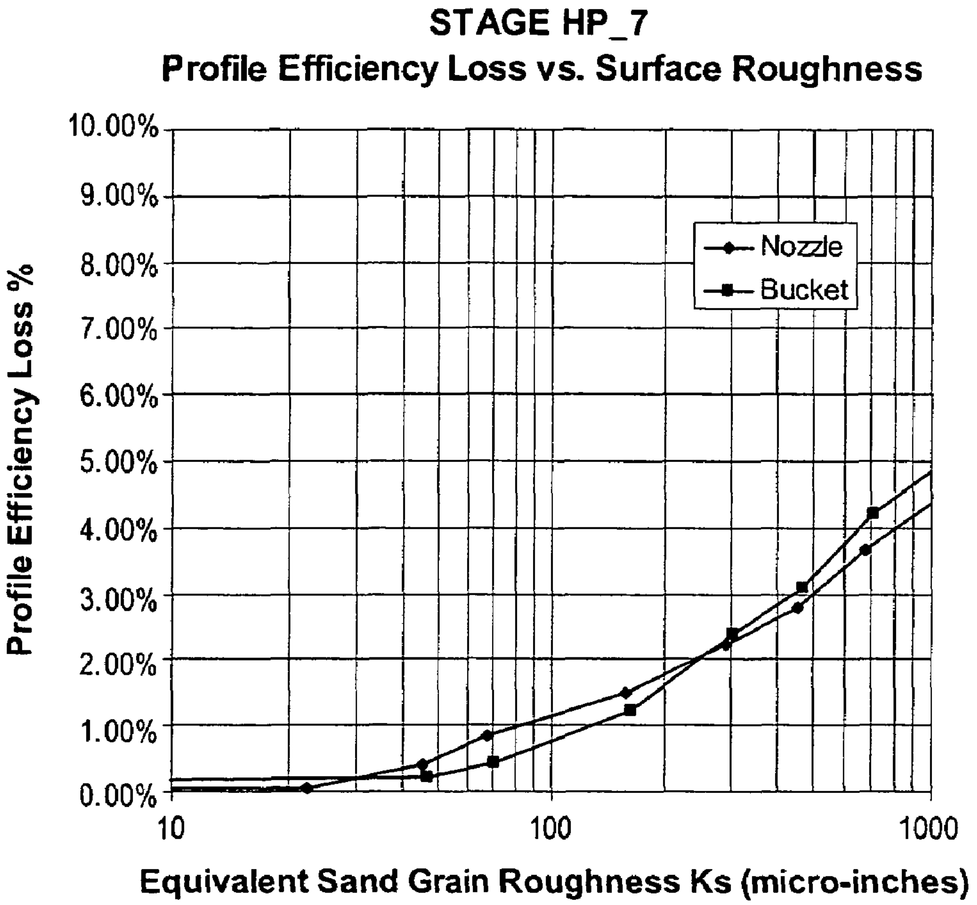
FIG. 9 is a graph relating sand grain roughness to local profile efficiency loss percentage for a nozzle and a bucket of a turbine in accordance with an exemplary embodiment of the present invention.

FIG. 9 illustrates a graph establishing a relationship between the sand grain roughness factor (Ks) and a local profile efficiency loss percentage. The sand grain roughness factor is arranged on one axis and the local profile efficiency loss percentage is arranged on the other axis. Different sand grain roughness factor to local profile efficiency loss data curves are established for the different turbine components. For example, different data curves are established for a nozzle and bucket of the turbine as shown in FIG. 9.

Processor 34 determines a local profile efficiency loss for each of the surface locations (or sub-areas of the surface locations) based on the sand grain roughness factor (Ks) earlier calculated for that surface location (or sub-area of the surface location) and the appropriate data curve (step 44 of FIG. 6). For example, a local profile efficiency loss (see col. 58 in FIG. 7) for each surface location (or sub-areas of each surface location) of nozzle 17 is determined for each corresponding sand grain roughness factor earlier determined. Alternatively, a local profile efficiency loss percentage for each surface location or each of its sub-areas is determined based on the Ks/L ratio (see col. 57 in FIG. 7) and profile curves relating Ks/L and local profile efficiency loss.

The local profile efficiency loss percentage for each surface condition of a particular surface location or sub-area (e.g., ASS1 and ASS2) of the surface location (e.g., ASS) is determined and stored by computer 30 as illustrated in column 58. Data in columns 51–55 of FIG. 7 thus reflects data originating from the technician, whereas data in columns 56–58 of FIG. 7 reflects data calculated by the computer 30 based on the data in columns 51–55. Weighting factors presented in column 60 of FIG. 7 are predefined but may vary depending on the type of turbine component being evaluated.

Processor 34 then calculates the average of all of the local profile efficiency losses of the surface locations or their respective sub-areas of the turbine component to determine the total profile efficiency loss for the entire turbine component (step 45 of FIG. 6). The total profile efficiency loss for the component is thus calculated on the basis on the respective surface conditions of multiple surface locations of the turbine component, thereby resulting in a highly accurate and repeatable calculation. In determining the total profile efficiency loss for the turbine component, each of the local profile efficiency loss percentages must be weighted. In particular, each of the local profile efficiency losses are weighted by a factor corresponding to that surface location's relative contribution to the total profile efficiency loss of the entire turbine component. Again, FIGS. 2 and 3 show the weighting factors for surface locations ASS, APS, DSS (including THT) and DPS for a nozzle and bucket, respectively. The weighting factors for a nozzle shown in FIG. 2 are listed in column 60 labeled "% of S.F. [Surface Finish] loss." As shown in FIG. 3, the weighting factors for a bucket differ from those for a nozzle. That is, the weighting factors in column 60 for the ASS, APS, DSS (including THT) and DPS would be different if the turbine component being evaluated were a bucket rather than a nozzle.

As illustrated in FIG. 7 for example, a total profile efficiency of nozzle 17 is calculated by averaging the local profile efficiency loss percentages listed in column 58 as weighted by the weighting factors in column 60. In particular, the local profile efficiency loss resulting from the surface conditions of sub-areas ASS1 and ASS2 of surface location ASS of nozzle 17 are weighted so that each makes a 2.5% contribution (5% weighting factor as shown in column 60 multiplied by 50% as shown in column 55) to the total profile efficiency loss of nozzle 17. The local profile efficiency loss resulting from the surface condition of the APS of nozzle 17 is weighted so that it makes a 5% contribution (5% weighting factor as shown in column 60 multiplied by 100% shown if column 55) to the total profile efficiency loss of nozzle 17. Using similar calculations, the respective contributions to the total profile efficiency loss of the turbine component from surface conditions of the other surface locations (or sub-areas of the surface locations) in the example illustrated in FIG. 7 are as follows: local profile efficiency losses from surface conditions of sub-areas THT1 and THT2 of the THT of DSS are weighted so that each makes a 3.5% (7%×50%) contribution to the total profile efficiency loss of nozzle 17, local profile efficiency losses from surface conditions of sub-areas DSS1 and DSS1 of surface location DSS are weighted so that each makes a 31.5% (63%×50%) contribution to the total profile efficiency loss of nozzle 17, and the local profile efficiency loss from the surface condition of DPS is weighted to make a 20% (20%×100%) contribution to the total profile efficiency loss of nozzle 17. The local profile efficiency losses from the respective surface conditions of areas ASS1, ASS2, APS, THT1, THT2, DSS1, DSS2 and DPS of nozzle 17 are first weighted by weighting factors and then averaged to determine the total profile efficiency loss of nozzle 17. The results of the total profile efficiency loss, equal to 0.524 in the example illustrated in FIG. 7, is output by computer 30. A technician can determine whether to repair or replace the turbine component as a result of the total profile efficiency loss. As noted above, the total profile efficiency loss for the turbine component is thus calculated on the basis of respective surface conditions at multiple surface locations of the turbine component.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of evaluating a turbine component, the method comprising:

obtaining data relating to respective surface conditions at a plurality of different surface locations of the turbine component; and calculating the total profile efficiency loss for the turbine component based on the data relating to the respective surface conditions at the different surface locations;

wherein the obtained data relating to surface conditions at each of the different surface locations is data relating to surface roughness.

2. A method of claim 1 wherein the obtained data relating to surface conditions at each of the different surface locations further includes data relating to a condition type and a severity of condition of each of the surface conditions, and calculating the total profile efficiency loss for the turbine component includes determining a surface roughness factor for each surface condition based on the condition type and the severity of the condition obtained for that surface condition.

3. A method of claim 1 wherein the turbine component is a nozzle and each of the surface locations of the nozzle is one of following: admission suction surface, admission pressure surface, discharge suction surface and discharge pressure surface.

4. A method of claim 1 wherein the turbine component is a bucket and each of the surface locations of the bucket is one of following: admission suction surface, admission pressure surface, discharge suction surface and discharge pressure surface.

5. A method of evaluating a turbine component, the method comprising:

obtaining data relating to respective surface conditions at a plurality of different surface locations of the turbine component; and calculating the total profile efficiency loss for the turbine component based on the data relating to the respective surface conditions at the different surface locations;

wherein calculating the total profile efficiency of the turbine component includes calculating the local profile efficiency loss percentage for each of the surface conditions at the different surface locations.

6. A method of claim 5 wherein calculating the total profile efficiency of the turbine component further includes calculating an average of the local profile efficiency loss percentages, each of the local efficiency loss percentages being weighted by respective predetermined weight factors.

7. A method of claim 5 wherein each of the local profile efficiency loss percentages for each of the surface conditions at the respective surface locations is calculated based on a sand grain roughness number (Ks) determined for that surface condition.

8. A method of evaluating a turbine component, the method comprising:

obtaining data relating to respective surface conditions at a plurality of different surface locations of the turbine component; and calculating the total profile efficiency loss for the turbine component based on the data relating to the respective surface conditions at the different surface locations;

wherein calculating the total profile efficiency of the turbine component includes calculating respective local profile efficiency loss percentages for each of the surface conditions at a plurality of sub-areas of at least one of the different surface locations.

9. A method of claim 8 wherein calculating the total profile efficiency of the turbine component further includes calculating an average of the local profile efficiency loss percentages, each of the local efficiency loss percentages being weighted by respective predetermined weight factors.

10. A method of claim 8 wherein each of the local profile efficiency loss percentages for each of the surface conditions at the respective sub-areas is calculated based on a sand grain roughness number (Ks) determined for that surface condition.

11. A method of claim 8 wherein obtaining the data includes obtaining data relating to a condition type and a severity of condition for each of the surface conditions at the sub-areas, and calculating the total profile efficiency loss for the turbine component includes determining a surface roughness factor for each of the surface conditions at each of the sub-areas based on the condition type and the severity of the condition obtained for that surface condition.

12. A method of evaluating a turbine component, the method comprising:

obtaining data relating to respective surface conditions at a plurality of different surface locations of the turbine component; and calculating the total profile efficiency loss for the turbine component based on the data relating to the respective surface conditions at the different surface locations;

wherein calculating the total profile efficiency loss for the turbine component includes calculating a sand grain roughness number (Ks) for each surface condition at the different surface locations.

13. A method of evaluating a turbine component, the method comprising:

obtaining data relating to respective surface conditions at a plurality of different surface locations of the turbine component; and calculating the total profile efficiency loss for the turbine component based on the data relating to the respective surface conditions at the different surface locations;

wherein calculating the total profile efficiency loss for the turbine component includes calculating a sand grain roughness number (Ks) for each surface condition at a plurality of sub-areas of at least one of the different surface locations.

14. A computerized system for evaluating a turbine component, the system comprising:

a data input that receives data relating to respective surface conditions at a plurality of different surface locations of the turbine component; and a processor that calculates the total profile efficiency loss for the turbine component based on the data relating to the respective surface conditions at the different surface locations;

wherein the received data relating to surface conditions at each of the different surface locations is data relating to surface roughness, surface condition type, and severity of the surface condition.

15. A system of claim 14 wherein the received data relating to surface conditions at each of the different surface locations further includes data relating to a condition type and a severity of condition of each of the surface conditions, and the processor calculates the total profile efficiency loss for the turbine component by at least determining a surface roughness factor for each surface condition based on the condition type and the severity of the condition obtained for that surface condition.

16. A system of claim 14 wherein the turbine component is a nozzle and each of the surface locations of the nozzle is one of following: admission suction surface, admission pressure surface, discharge suction surface and discharge pressure surface.

17. A system of claim 14 wherein the turbine component is a bucket and each of the surface locations of the bucket is one of following: admission suction surface, admission pressure surface, discharge suction surface and discharge pressure surface.

18. A computerized system for evaluating a turbine component, the system comprising:

a data input that receives data relating to respective surface conditions at a plurality of different surface locations of the turbine component; and a processor that calculates the total profile efficiency loss for the turbine component based on the data relating to the respective surface conditions at the different surface locations;

wherein the processor calculates the total profile efficiency of the turbine component by at least calculating the local profile efficiency loss percentage for each of the surface conditions at the different surface locations.

19. A system of claim 18 wherein the processor calculates the total profile efficiency of the turbine component by at least calculating an average of the local profile efficiency loss percentages, each of the local efficiency loss percentages being weighted by respective predetermined weight factors.

20. A system of claim 18 wherein each of the local profile efficiency loss percentages for each of the surface conditions at the respective surface locations is calculated by the processor based on a sand grain roughness number (Ks) determined for that surface condition.

21. A computerized system for evaluating a turbine component, the system comprising:

a data input that receives data relating to respective surface conditions at a plurality of different surface locations of the turbine component; and a processor that calculates the total profile efficiency loss for the turbine component based on the data relating to the respective surface conditions at the different surface locations;

wherein the processor calculates the total profile efficiency of the turbine component by at least calculating respective local profile efficiency loss percentages for each of the surface conditions at a plurality of sub-areas of at least one of the different surface locations.

22. A system of claim 21 wherein the processor calculates the total profile efficiency of the turbine component by at least calculating an average of the local profile efficiency loss percentages, each of the local efficiency loss percentages being weighted by respective predetermined weight factors.

23. A system of claim 21 wherein each of the local profile efficiency loss percentages for each of the surface conditions at the respective sub-areas is calculated by the processor based on a sand grain roughness number (Ks) determined for that surface condition.

24. A system of claim 21 wherein the received data includes data relating to a condition type and a severity of condition for each of the surface conditions at the sub-areas, and the processor calculates the total profile efficiency loss for the turbine component by at least determining a surface roughness factor for each of the surface conditions at each of the sub-areas based on the condition type and the severity of the condition obtained for that surface condition.

25. A computerized system for evaluating a turbine component, the system comprising:

a data input that receives data relating to respective surface conditions at a plurality of different surface locations of the turbine component; and a processor that calculates the total profile efficiency loss for the turbine component based on the data relating to the respective surface conditions at the different surface locations;

wherein the processor calculates the total profile efficiency loss for the turbine component by at least calculating a sand grain roughness number (Ks) for each surface condition at the different surface locations.

26. A computerized system for evaluating a turbine component, the system comprising:

a data input that receives data relating to respective surface conditions at a plurality of different surface locations of the turbine component; and a processor that calculates the total profile efficiency loss for the turbine component based on the data relating to the respective surface conditions at the different surface locations;

wherein the processor calculates the total profile efficiency loss for the turbine component by at least calculating a sand grain roughness number (Ks) for each surface condition at a plurality of sub-areas of at least one of the different surface locations.

* * * * *